June 10, 1930.  T. L. GREEN  1,762,268
DOUGH SHEETING MACHINE
Filed Feb. 24, 1920   6 Sheets-Sheet 1

Inventor.
Thomas L. Green
Emery, Booth, Janney & Varney
Attys.

June 10, 1930. T. L. GREEN 1,762,268
DOUGH SHEETING MACHINE
Filed Feb. 24, 1920 6 Sheets-Sheet 4

Fig. 6.

Inventor.
Thomas L. Green
Emery, Booth, Janney & Varney.
Attys.

June 10, 1930. T. L. GREEN 1,762,268
DOUGH SHEETING MACHINE
Filed Feb. 24, 1920 6 Sheets-Sheet 6

Fig. 8.

Inventor:
Thomas L. Green
Emery, Booth, Janney & Varney.
Attys.

Patented June 10, 1930

1,762,268

UNITED STATES PATENT OFFICE

THOMAS L. GREEN, OF INDIANAPOLIS, INDIANA

DOUGH-SHEETING MACHINE

Application filed February 24, 1920. Serial No. 361,031.

This invention relates to machines for use in reducing dough or the like to condition for subdividing into products for baking.

Among other objects, the invention is intended to provide reliable means for mechanically rolling, folding and cross-rolling the dough.

Another of the objects of the invention is to eliminate separate handling of the dough between the batch mixer and a biscuit-cutting or other subdividing machine, and to deliver the dough automatically from the mixer to said machine while passing it through desirable sheeting operations.

The character of the invention will be best understood by reference to one form of machine containing an embodiment of the invention which is shown for illustration in the accompanying drawings.

Referring to the drawings, 1 indicates a hopper or trough into which dough is discharged from a mixer. From the hopper 1, the dough is fed continuously through the illustrative machine and is delivered in sheet form immediately to the gauge rolls R (Fig. 4) of a conventional biscuit cutting machine or other machine for subdividing the dough into products for delivery to baking ovens.

In the hopper 1 the dough is subjected to a kneading operation by vibration of the converging hopper walls 2. These walls are hung from pivot supports 3, and their lower depending portions are oscillated toward and from each other by connection with the rocker shafts 4 through lever arms 5 and links 6. The oscillation of the walls alternately distends and contracts the discharge throw of the hopper, thus continuously working and shaping the dough, which discharges in the form of a comparatively thick sheet or column 7.

The column of dough issuing from the hopper passes between a pair of sheeting rollers 8 which reduce it to a sheet. As the dough passes through the rollers it is supplied with flour to provide the proper skin and prevent sticking. For this purpose flour is continuously discharged upon the peripheries of the rollers from the flour boxes 99 at opposite sides of the hopper.

Figure 1:
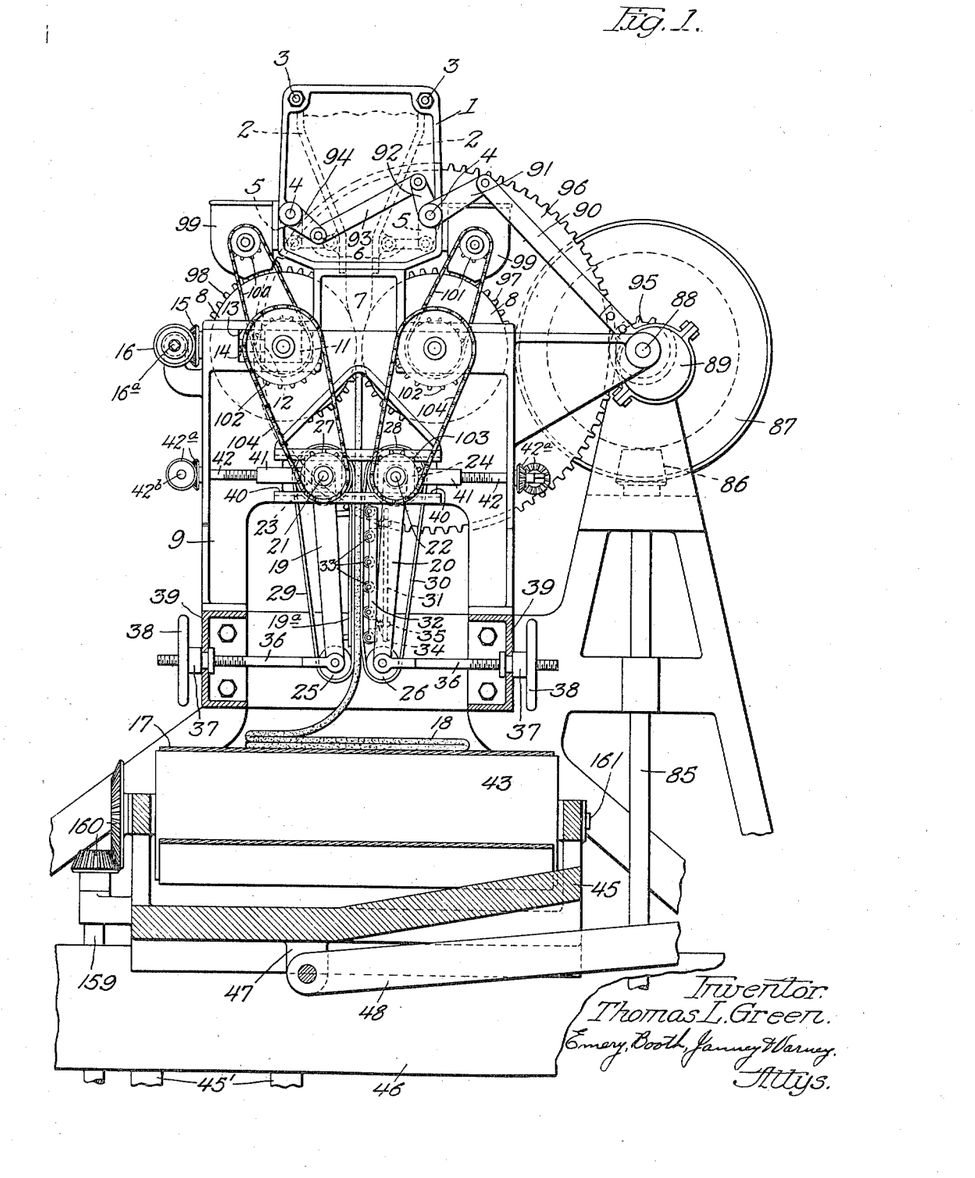
Fig. 1 is a sectional elevation of the illustrative machine taken in the line 1—1 of Fig. 6, looking in the direction of the arrows and showing the mechanism of the receiving end of the machine in rear elevation.
Figure 6:
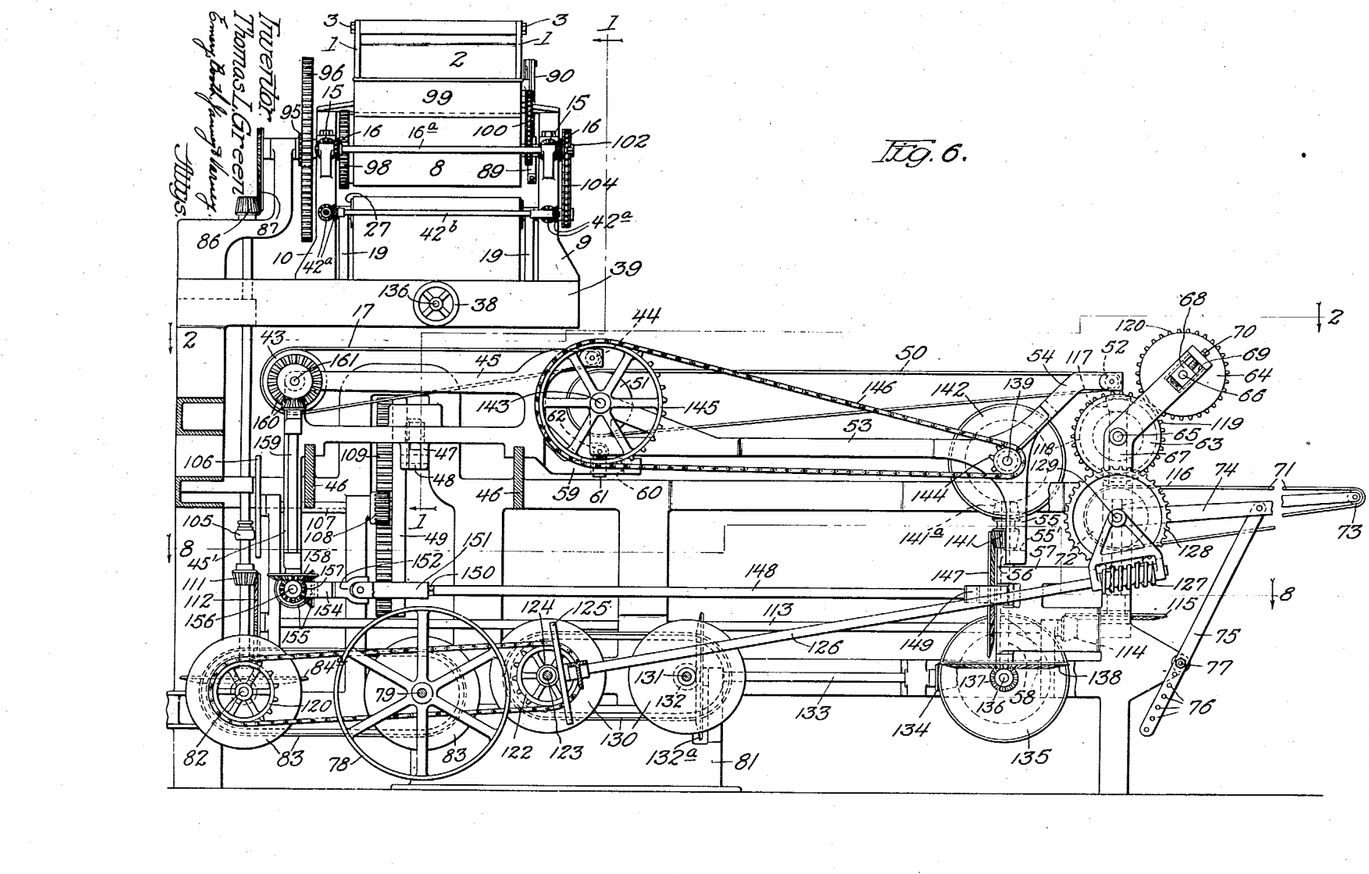
Fig. 6 is a sectional side elevation of the illustrative machine taken on the line 6—6 of Fig. 7.

For adjusting the space between the rollers to permit reduction of the dough to a sheet of any desired thickness, one of the rollers, as shown in Figs. 1 and 6, has its journals mounted in bearing blocks 11 movable in slide ways 13 in the opposite frame members 9 and 10 between which the rollers are mounted; said blocks 11 having internally threaded sleeves 12 engaged by adjusting screws 14 adapted to be operated through bevel gears 15 and 16 from shaft 16ª. One end of the shaft 16ª is squared for application of a wrench or crank for turning the shaft for adjusting purposes.

The sheet of dough delivered from the rollers 8 is to be folded and cross-rolled during its transit to the biscuit cutting machine. For this purpose the moving sheet is deflected alternately in opposite directions while being deposited upon a carrier or belt 17 running in a direction cross-wise of the depositing sheet. It is thus laid in reverse folds across the belt, the longitudinal travel of which causes the folds to assume the zig-zag overlapping relationship indicated in Fig. 2. In this folded form the dough is passed through a second set of rollers which again reduces it to a sheet, the second rolling being cross-wise of the direction of the first rolling.

For folding the dough sheet, a relative oscillating movement between the sheeting rollers 8 and the receiving carrier or belt 17 is produced in the illustrative machine by lateral reciprocation of the carrier. The sheet is accordingly laid across the carrier from one side to the other in alternation as the carrier moves transversely first in one direction and then in the other. Among other advantages, this method of folding provides a gentle deflecting action by the contact of the sheet with the carrier, and contributes to minimization of pulling strains and tearing tendencies.

One complete reciprocation of the receiving carrier or belt 17 corresponds to the peripheral movement of the rollers 8 for feeding the length of sheet to form one fold, or in other words corresponds to the lineal movement of a length of the sheet twice the required width of the folded material on the carrier. The forward movement of the carrier is relatively slow to allow the folds to form in the overlapping zig-zag relationship indicated.

There should be sufficient room above the receiving carrier for folding the dough sheet without too severe deflection from its point of suspension, and yet the sheet should not hang for so great a distance so as to subject it to substantial tensile strain. Certain doughs, such for example as doughs for short cake, have very little tensile strength and would easily break under their own weight if left unsupported for any considerable distance. Hence in view of the large diameter of the sheeting rollers 8, it is desirable to support the sheet below the rollers so as to relieve it practically of tensile strain and to locate the receiving carrier 17 below the supporting means.

The office of supporting the dough sheet between the sheeting rollers and the receiving carrier is accomplished in the illustrative machine by a pair of endless belts 29 and 30, the adjacent runs of which travel in the same direction and at the same speed as the dough sheet, and cooperate to grip the sheet between them with sufficient pressure to relieve the sheet of the strain of its own weight. Thus the action of the belts 29 and 30 is a positive feeding action synchronous with the feeding action of the sheeting rollers, and the sheet is longitudinally supported from a point just below the rollers to a point adjacent the flexure in the dough sheet.

Figure 2:
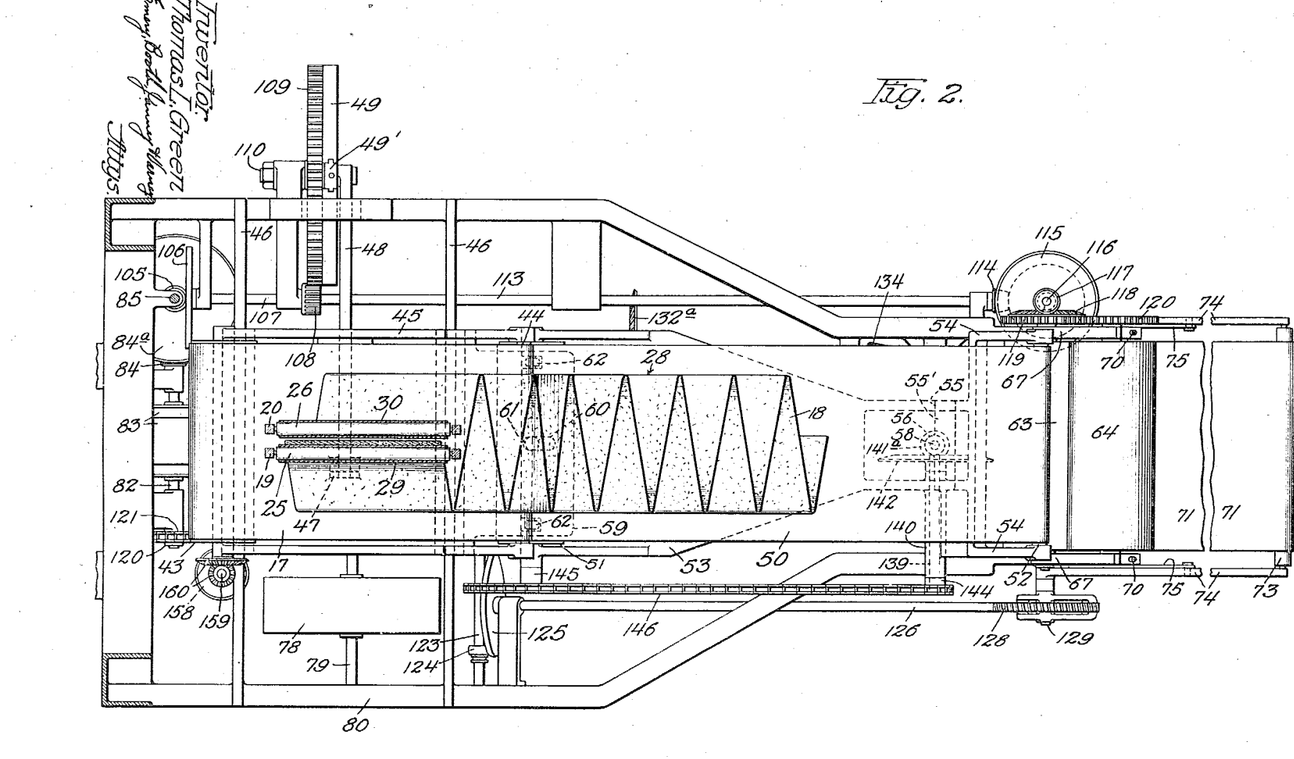
Fig. 2 is a sectional plan view of the illustrative machine taken on the line 2—2 of Fig. 6.
Figure 5:
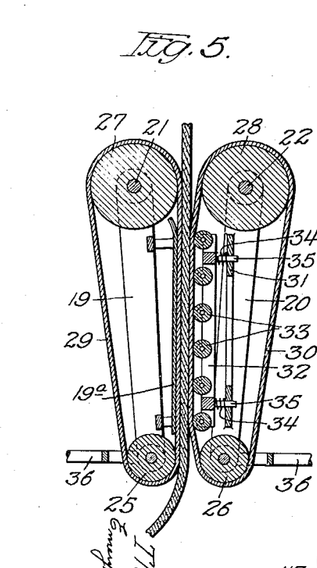
Fig. 5 is a cross section of sheet supporting mechanism between the rolling and folding means of the illustrative machine.

As shown in Figs. 2, 5 and 6, the cooperating belts 29 and 30 are trained around upper rollers 27, 28 and lower rollers 25, 26; the rollers for the belt 29 being connected by a frame 19 and those for belt 30 being connected by a frame 20. The lower rollers 25, 26 are comparatively small and thus provide for emergence of the dough sheet between surfaces close to the point of emergence; and also provide in the illustrative machine a substantially fixed point of emergence in relation to the sheeting rollers.

For applying pressure through the cooperating belts upon the dough sheet, there is provided within the belt 29 a plate 19$^a$ supported by the frame 19, and bearing against the inner surface of said belt 29, as shown in Fig. 5. Within the belt 30 there is provided a web 31, supported by the frame 20. The web 31 supports a frame 32 bearing a series of pressure rollers 33 arranged to engage the inner surface of said belt 30. This frame with its rollers is yieldingly forced toward the plate 19$^a$ by springs 34 encircling the studs 35 which extend from the roller frame through apertures in the supporting web 31. Any suitable provision may be made for adjusting the tension of the springs or other means for yieldingly forcing the pressure rollers toward the plate. Thus the dough sheet is gripped between the cooperating runs of the belts, the latter being pressed between the plate 19$^a$ and pressure rollers 33, and the traveling sheet is thereby supported along its path of travel, while being at the same time subject to compression which promotes the adhesion of its particles in the case of short or friable doughs.

For adjusting the belts 29 and 30, the shafts 21, 22 of the upper rollers 27, 28 are journalled in blocks 23, 24 sliding in ways 40 in the frames 9 and 10. From these blocks extend internally threaded sleeves 41 engaging the threaded ends of the screw shafts 42. Said shafts 42 are connected by bevel gears 42$^a$ with transverse shafts 42$^b$. One of the screw shafts 42, the right-hand shaft as viewed in Fig. 1, has a squared end for application thereto of a crank or wrench, and rotative movement applied to said shaft is transmitted through the bevel gears and cross-shafts so that the bearings for the upper rollers of the belts are simultaneously adjusted.

The lower rollers 25, 26 of the belts are supported in the frames 19, 20 which are hung from the shafts 21, 22, and the shafts of the lower rollers are connected by yokes to rods 36 having screw threaded portions engaged by interiorly threaded hub portions 37 of adjusting hand wheels 38 journalled in the frame member 39.

By the means described, the cooperating belts 29 and 30 may be adjusted in accordance with the thickness of the sheet delivered from the sheeting rollers 8, or to vary the pressure to be applied upon a given thickness of sheet, according to the character of the material composing the sheet; and the upper and lower ends of the belts may be independently adjusted so as to apply more or less pressure either at the receiving or delivering end of the belts as desired.

In the folding operation, the dough sheet is deflected from the delivery end of the conveying belts 29 and 30 by the relative lateral motion of the receiving carrier 17, while being bodily supported above and contiguous to the point of deflection, and without being subjected to abrupt flexures and severe pulls in its suspended portion emerging from the belts and depositing upon the receiving carrier. Both of these factors contribute importantly to the safe handling of doughs of various consistencies, including short cake doughs and the like which are deficient in tensile strength.

The receiving carrier 17 in the illustrative machine comprises an endless belt running around the large driving roller 43 and the small roller 44 at its delivery end, the roller 44 being preferably journalled in adjustable bearings to permit tensioning the belt. The belt and rollers are mounted in a carriage 45 which is slidable transversely of the machine on rails 46 (Figs. 1, 2, 6 and 7). Reciprocatory movement is imparted to the carriage 45 from the crank disc 49 (Figs. 2, 6 and 7) through a pitman 48 connected with ears 47 depending from the carriage.

For adjusting the length of folds of the dough sheet upon the receiving carrier, the extent of reciprocation of the carriage 45 may be varied by varying the throw of the crank disc 49. For this purpose the pitman 48 may be connected with a crank wrist pin carried by a radial adjustable block 49' as shown in dotted lines in Fig. 7.

As before indicated, the longitudinal travel of the receiving carrier 17 disposes the successive folds of the dough sheet in the overlapped zig-zag relationship shown in Fig. 2, and the material in this state is passed through a second set of sheeting rollers which roll it in the direction of its over-all length and hence cross-wise of the folds.

For delivering the material to the second set of sheeting rollers, there is provided in the illustrative machine a swinging transfer apron or belt 50, which oscillates on a pivot bearing adjacent its delivery end, while its receiving end is arranged under and partakes of the lateral reciprocatory movement of the delivery end of the carier 17. Thus the transfer apron 50 constitutes a continuation of the dough conveying means for delivering the material to stationary sheeting rollers arranged for operation cross-wise of the first set of sheeting rollers.

Figure 3:
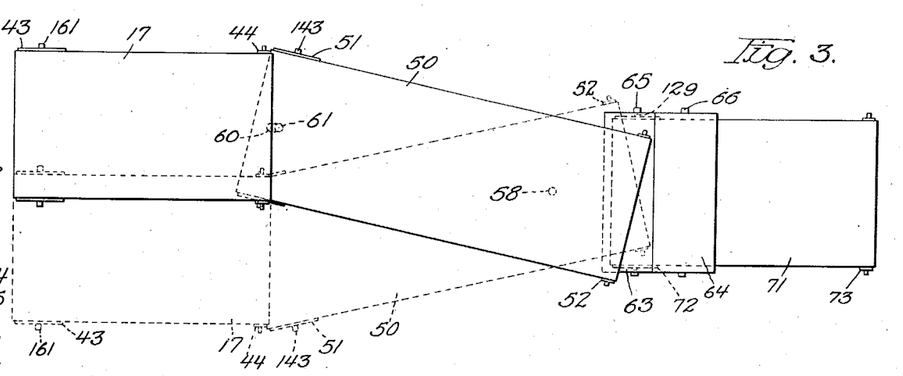
Fig. 3 is a plan view of the receiving and transfer belts and cross-rolling rollers of the illustrative machine, opposite extreme positions of the belts in the process of folding the dough sheet being shown by full and dotted lines respectively.
Figure 4:
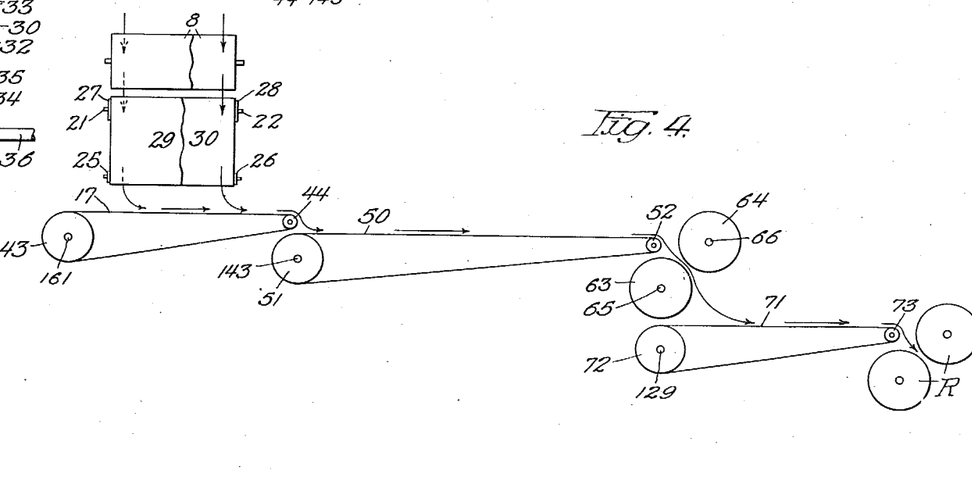
Fig. 4 is a diagrammatic side view of the main elements of the illustrative machine.

The bodily movements of the receiving carrier 17 and the transfer apron 50, in folding the dough sheet and delivering it to the second set of sheeting rollers, will be apparent from the diagrammatic views in Figs. 3 and 4 of the drawings.

The transfer apron 50 is trained around the driving roller 51 at its receiving end, and the smaller roller 52 at its delivery end, the roller 52 being preferably adjustable for tensioning the belt. Said belt and rollers are mounted in a swinging frame 53, shown in plan view in Fig. 2 and in side elevation in Fig. 6. The sides of this frame converge forwardly as indicated in dotted lines in Fig. 2, and at its forward end the frame is formed with the upwardly inclined yoke 54 supporting the bearings of the roller 52, and with a depending yoke member 55, shown in Figs. 2 and 6 and in cross section in Fig. 8. This depending yoke 55 has its lower cross member 55' pivotally supported upon the cross member 57 of the main frame of the machine, with which it is connected through a sort of king-bolt connection by means of the vertical shaft 58 forming a part of the power transmission hereinafter referred to; said shaft 58 being journalled in the cross-frame member 57 and in a bearing lug 56 at the bottom of the yoke 55.

The frame 53 of the transfer apron is operatively connected with, supported and moved laterally by the carriage 45 of the receiving carrier 17. For this purpose, the carriage 45 is shown formed with the wide ledge or shelf 59 (Figs. 2 and 6) extending under the driving roller 51 of the transfer apron, and in the central portion of this shelf there is an elongated aperture or slot 60 (shown in dotted lines in Fig. 2) through which extends a stud 61 projecting downwardly from the frame 53 of the transfer apron. For supporting the receiving end of the transfer apron frame upon the shelf 59, without tipping of the frame, anti-friction rollers or casters 62 depend from the said frame and bear upon the upper surface of the shelf referred to.

From the construction and arrangement of parts described, it will be apparent that the dough sheet will be advanced from the longitudinally moving and transversely reciprocating carrier 17 upon the receiving end of the oscillating transfer apron 50, and advanced by the latter to the second set of sheeting rollers, without too abrupt or severe deflection of the folded material in its line of advance.

The sheeting rollers 63 and 64 of the second set are shown mounted upon shafts 65 and 66 respectively, journalled in standards 67 of the frame of the machine, the standards being angled at their upper extremities to afford a bearing for the upper roller of the set as shown in Fig. 6. Means are also provided for adjusting the two rollers varying distances apart to provide for sheeting in varying degrees of thickness as in the case of the first set of rolls, the means being here shown in Fig. 6 as of substantially the same character as the adjusting means for the first set of rolls, namely the blocks 68 adjusted in the slideways 69 by the screws 70.

From the transfer apron 50 the folded dough material is passed between the sheeting rollers 63 and 64 which subject it to a second rolling in the direction of the travel of the material and hence across the laps or folds therein or transverse to direction of the first rolling administered by the first set of sheeting rollers. Thus the dough is again reduced to a sheet of uniform thickness, in which condition it may if desired be subjected to additional folding and cross rolling operations by means such as already described or it may be deposited upon the delivery apron 71 and conveyed to the biscuit-cutting machine.

This delivery apron is shown trained around the rollers 72 and 73, the former of which is journalled in the standards 67 and the latter of which is journalled between the outer ends of the parallel bars 74 pivoted upon the standards 67 and adjustably supported in extended position by the bars 75 having a series of perforations 76 through any one of which the bolt 77 secures the same to the framework of the machine. Thus the delivery apron is adjustably positioned at various elevations to effect the delivery of the dough sheet to the gauge rolls, biscuit-cutting or other subdividing machines of varying heights.

For operating the foregoing mechanisms the illustrative machine is provided with power and transmission means as will now be described.

Figure 7:
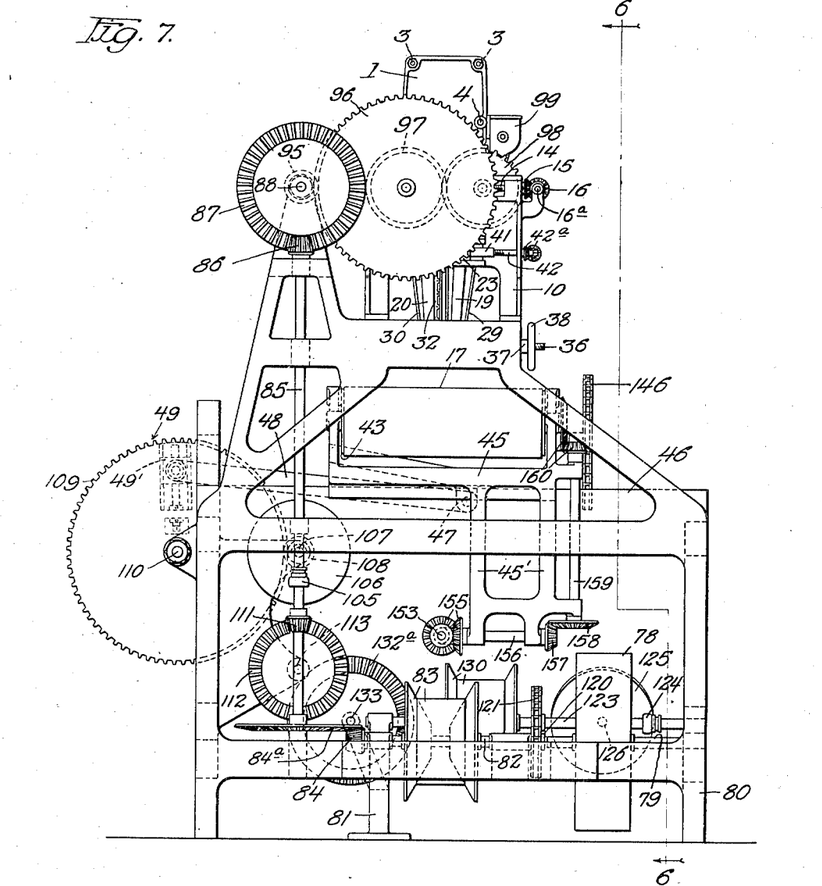
Fig. 7 is a front end elevation of the illustrative machine.
Figure 8:
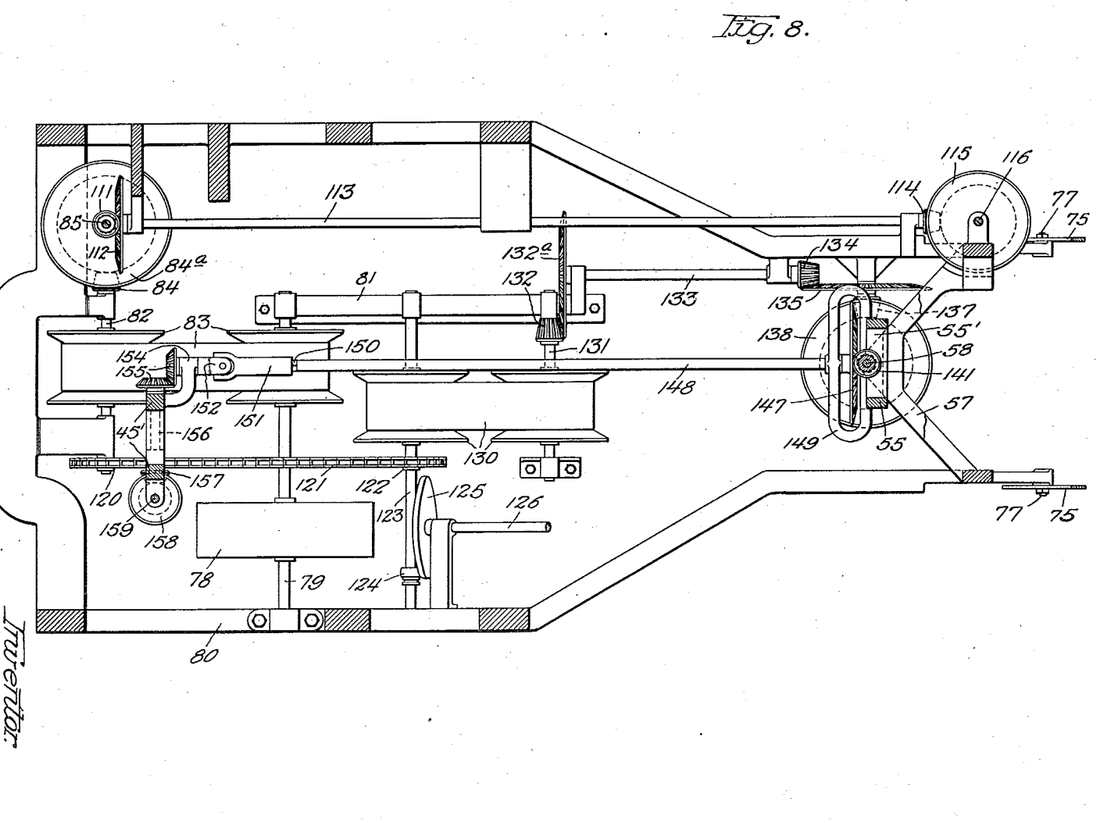
Fig. 8 is a horizontal section on the line 8—8 of Fig. 6 showing various elements of the driving mechanism in plan view.

Referring to Figs. 2, 6, 7 and 8, power is applied to the pulley 78 secured to the lower horizontal shaft 79 journalled in one of the frame side members 80 and in a central supplemental supporting frame 81 (Fig. 8). Upon the shaft 79 are slidably secured two opposed cones of a set forming with a similar set upon the shaft 82, and the belt entrained upon them, the well known Reeves variable speed transmission indicated as a whole by the numeral 83, by which the shaft 82 is driven.

The shaft 82 through the bevel pinion 84 and bevel gear 84ª (Figs. 7 and 8) drives the vertical shaft 85 having secured to its upper end the bevel gear 86 engaging the gear 87 on the horizontal shaft 88 (Figs. 1 and 7) which by the rotation thus imparted to it oscillates the side walls 2 of the hopper 1 through the eccentric 89, the pitman 90, arms 91 and 92 on one rocker shaft 4, and the connecting link 93 and the arm 94 on the other rock shaft 4.

The shaft 88 also drives the sheeting rollers 8 through the small spur gear 95 said shaft meshing with the large spur gear 96 on the shaft of the right hand sheeting roll, as viewed in Fig. 1; the shafts of said sheeting rollers being provided with intermeshing gears 97 and 98 whereby the rollers rotate oppositely in the proper direction for rolling and feeding the sheet.

Rotative movement is imparted to agitators in the flour boxes 99, whereby the flour therein is sifted downwardly through openings in their bases upon the sheeting rollers 8, by the chain and sprocket connections 100 and 101 (Fig. 1) between the agitator shafts and the shafts of the sheeting rolls.

The cooperating belts 29 and 30 which support the descending dough sheet are driven from the shaft of the sheeting rollers through the sprockets 102 on said shafts, the sprockets 103 on the shafts of the uper belt rollers 27 and 28, and the connecting sprocket chains 104; the driving connections being of proper ratio to drive said belts at the same speed as the peripheral speed of the sheeting rollers.

Secured upon the vertical shaft 85, and capable of a sliding adjustment thereon to vary the transmitted speed of rotation, is the friction wheel 105 (Fig. 7) engaging and driving the friction disc 106 on the horizontal shaft 107 (Figs. 2 and 7), the rotation of which imparts a reciprocating movement to the carriage 45 of the receiving carrier 17 through the spur pinion 108 on this shaft meshing with the large spur gear 109 on the shaft 110 of the crank disc 49, which as before stated reciprocates said carriage through the pitman 48.

The longitudinal travel of the receiving carrier 17, and of the transfer apron 50, is derived from the vertical shaft 58 which, as before stated, constitutes the king-bolt or pivot connection of the swinging transfer apron frame 53. This vertical shaft 58 is driven from the horizontal shaft 82 at the front of the machine through the connections illustrated in Figs. 6 and 8. On the shaft 82 is a sprocket wheel 120 which through sprocket chain 121 communicates motion to a sprocket wheel 122 on a shaft 123. Said shaft 123 communicates motion through a second Reeves variable speed transmission 130 to shaft 131. Shaft 131 communicates motion through bevel pinion 132 and bevel gear 132ª to longitudinal shaft 133, which through bevel pinion 134 and bevel gear 135 drives horizontal shaft 136 located below the vertical shaft 58. Said shaft 136 drives the vertical shaft 58 through bevel pinion 137 and bevel gear 138.

By means of the variable speed mechanism 130, the rate of travel of the receiving carrier 17, in relation to the rate of discharge of the dough sheet upon the carrier, may be adjusted to vary the angle at which the folded portions of the dough sheet are deposited, thereby varying the laminations of dough superimposed on each other to be subjected to cross-rolling.

For producing the longitudinal travel of the receiving carrier or belt 17, the driving roller 43 thereof is driven through mechanism carried by the carriage 45 of said receiving carrier, said mechanism being driven from the aforesaid vertical shaft 58 as will now be described. On said vertical shaft 58 is a bevel pinion 141 meshing with a bevel gear 147 of a laterally swinging longitudinal shaft 148. The end of said shaft 148 is journalled in a yoke 149, which encloses said bevel gear 147, the yoke 149 being supported in a recess of the cross frame member 57 and being pivoted on the aforesaid vertical shaft 58 which extends through an aperture in the rear side of the yoke. The opposite end of said swinging shaft 148 is squared as shown at 150 (Figs. 6 and 8) and is slidably fitted in a sleeve 151 coupled by a universal joint 152 to a short shaft 153 (Figs. 6, 7 and 8) journalled in the bearing 154 (Fig. 8). Said bearing 154 is carried by the depending portion 45′ of the carriage 45 of the receiving carrier 17, as is shown most clearly in Fig. 7. This short shaft 153 through the mitre-gears 155 drives the horizontal shaft 156 carried by the aforesaid depending portion of the carriage 45. Said shaft 156 at its outer end is provided with a bevel pinion 157 meshing with bevel gear 158 on vertical shaft 159, also carried by the carriage. Said vertical shaft 159 at its upper end drives through bevel gears 160 the shaft 161 of the driving roller 43 of the receiving carrier.

It will be observed that as the carriage of the receiving carrier 17 reciprocates laterally, the longitudinal shaft 148 which swings from the vertical pivot shaft 58 slides in the sleeve 151, which is universally coupled with the driving mechanism carried by the carriage; thus providing required shortening and extension of the transmission connection to permit the side reciprocatory movement of the carriage.

For producing the forward travel of the transfer apron 50, the driving roller 51 of said apron derives motion from the said vertical shaft 58 on which the swinging frame of said apron is pivoted, by the means now to be explained. On said shaft 58 is a bevel pinion 141ᵃ meshing with bevel gear 142 on a horizontal shaft 139 mounted cross-wise above said vertical shaft in a bearing 140 extending laterally from the swinging frame 53. Said shaft 139 communicates motion by a sprocket pinion 144 and sprocket chain 146 to sprocket wheel 145 on shaft 143 of the driving roller 51 of said transfer apron. It will be observed that the arrangement described permits the swinging of the apron on its pivot.

The second set of sheeting rollers 63 and 64, derive motion from the vertical shaft 85 at the front end of the machine through the means now to be described. Said shaft 85 is provided with a bevel pinion 111 meshing with bevel gear 112 on a longitudinal shaft 113 (Figs. 6, 7 and 8). The opposite end of the longitudinal shaft 113 is provided with a bevel-pinion 114 meshing with a bevel gear 115 on the lower end of the vertical shaft 116, at the upper end of which is bevel pinion 117 (Fig. 2). Said pinion 117 meshes with bevel gear 118 secured to the shaft 65 of the roller 63. The shafts of the rollers are provided with inter-meshing spur gears 119 and 120, whereby the rollers are oppositely rotated in the proper direction for rolling and passing the sheet to the delivery carrier.

For driving the delivery apron 71, motion is derived from shaft 123 (Figs. 2, 6 and 8) already mentioned as a part of the transmission to the driving connections for the receiving and transfer apron. Said shaft 123 is provided with the sliding friction wheel 124 adapted to engage and drive the friction disc 125 secured to the forward lower end of the inclined shaft 126, which at its opposite end is provided with worm 127 (Fig. 6) meshing with the worm-wheel 128 on the shaft 129 of the driving roller 72 of said delivery apron. The worm and adjacent end of the shaft are supported in a bearing hung from the shaft 129.

The illustrative machine provides a reliable method of rolling, folding and cross-rolling, applicable to doughs of various consistencies; avoids separate handling and manual operations between the mixer and biscuit cutting machine, and eliminates the dangerous operation of the baker ordinarily used in biscuit factories for rolling and re-rolling the dough.

Obviously the present invention is not limited to any specific embodiment, and the details of construction and arrangement of the illustrative machine may be variously modified. Moreover, it is not indispensable that all of the features of the invention be used conjointly, as they may be used to advantage in various combinations and sub-combinations.

Having thus described my invention, I claim:

1. A machine of the class described comprising, in combination, sets of dough sheeting rollers disposed transversely of each other for operation upon traveling dough at successive points in its line of travel; and an intermediate carrier upon which the sheet is deposited, said carrier traveling in a direction to deliver the dough thereon to the second rollers while oscillating laterally to fold the sheet depositing thereon in alternate directions across the carrier.

2. A machine of the class described comprising, in combination, sets of dough sheeting rollers disposed transversely of each other for operation upon traveling dough at successive points in its line of travel; an intermediate carrier upon which the sheet is deposited, said carrier traveling in a direction to deliver the dough thereon to the second rollers while oscillating laterally to fold the sheet depositing thereon in alternate directions across the carrier; and a swinging transfer carrier, the receiving end of which moves laterally with the first mentioned carrier, for transferring the folded material from said first mentioned carrier to the second rollers.

3. A machine of the class described comprising, in combination, dough sheeting rollers; a receiving carrier moving crosswise of the sheet delivered thereto from said rollers; means for relatively moving said rollers and carrier alternately in opposite directions transversely of the carrier, whereby the depositing sheet is folded to and fro across the carrier; and means for rolling the folded material in the direction of its over-all length to reduce it to a sheet.

4. A machine of the class described comprising, in combination, dough sheeting rollers; a receiving carrier traveling cross-wise of the sheet delivered from said rollers; means for supporting the sheet between said rollers and carrier; means for relatively moving said rollers and carrier alternately in opposite directions transversely of the carrier, whereby the depositing sheet is folded alternately in reverse directions across the carrier; and sheeting rollers for operation upon the folded material delivered by said carrier.

5. A machine of the class described comprising, in combination, dough sheeting rollers; traveling means receiving the sheet from said rollers and supporting the same to relieve it of tensile strain; a receiving carrier upon which the sheet is deposited, said carrier traveling in a direction cross-wise of the depositing sheet while oscillating laterally to fold the sheet; and sheeting rollers for operation upon the folded material delivered by said carrier.

6. A machine of the class described comprising, in combination, dough sheeting rollers; traveling means receiving the sheet from said rollers and supporting the same to relieve it of tensile strain; said traveling means comprising conveyer-belts and means whereby said belts press against and grip the sheet between them; a receiving carrier upon which the sheet is delivered from said means; said carrier traveling in a direction crosswise of the depositing sheet; means for relatively moving the carrier and sheet supporting means alternately in opposite directions transversely of the carrier, whereby the sheet is folded to and fro across the carrier; and sheeting rollers for operation upon the folded material delivered by said carrier.

7. A machine of the class described comprising, in combination, dough sheeting rollers; a subjacent receiving carrier traveling in a direction crosswise of the depositing dough sheet and oscillating laterally to fold the dough sheet; and means for cross-rolling the folded dough.

8. A machine of the class described comprising, in combination, dough sheeting rollers; a subjacent receiving carrier traveling in a direction crosswise of the depositing dough sheet; intermediate sheet-engaging means; means for relatively moving the rollers and receiving carrier for folding the dough sheet to and from across the carrier; said intermediate sheet engaging means causing deflection of the sheet in the folding operation from a fixed point relative to the rollers; and means for rolling the folded dough.

9. A machine of the class described comprising, in combination, dough sheeting rollers; a subjacent receiving surface; cooperating belts which receive the sheet between them from said rollers and deposit the same on said receiving surface, said belts having associated therewith pressure-applying means for pressing the coacting runs of said belts throughout the greater portions of their lengths toward each other and thus causing them to grip and support the dough sheet; means for relatively moving the rollers and receiving surface for folding the dough sheet; and means for rolling the folded material.

10. A machine of the class described comprising, in combination, dough sheeting rollers; a relatively movable receiving surface for folding the dough sheet; intermediate sheet engaging means in fixed relation to the rollers; said sheet engaged means comprising sheet-gripping belts and means pressing said belts one toward the other for substantially the length thereof in engagement with the sheet; and means for reducing the folded material to a sheet.

11. A machine of the class described comprising, in combination, dough sheeting rollers; a relatively movable receiving surface for folding the dough; intermediate sheet supporting means; said sheet supporting means comprising cooperating sheet gripping belts, a plate in contact with which one of the belts runs, and a series of pressure rollers bearing against the other belt and pressing it and the sheet toward the first mentioned belt and plate; and means for rolling the folded material.

12. In a machine of the class described, the combination, with dough sheeting means, of sheet folding mechanism comprising supporting and receiving surfaces relatively movable for successively folding the dough sheet, said supporting surfaces delivering to said receiving surface at a point in fixed relation to said sheeting means, and said receiving surface movable cross-wise of the sheet for disposing the folds in zig-zag relationship.

13. In a machine of the class described, the combination with dough sheeting rolls, of sheet folding means including a substantially fixed sheet delivery means, and a receiving carrier traveling crosswise the sheet delivered thereto, and means to give said carrier a to-and-fro lateral motion in a rectilinear direction relative to said sheet delivery means, whereby substantially uniform folding is had from side to side of the receiving carrier.

14. A machine of the class described comprising, in combination, dough sheetings rollers; cooperating pressure-applying belts for supporting the dough sheet delivered from said rollers; and a relatively laterally reciprocating receiving carrier traveling crosswise of the sheet.

15. A machine of the class described comprising, in combination, dough sheeting rollers; cooperating pressure-applying belts for supporting the dough sheet delivered from said rollers; means causing said belts to press or grip the sheet for a substantial distance; means for folding the dough sheet in alternating reverse folds while disposing the folds in zig-zag relationship; and means for rolling the folded material cross-wise of the folds.

16. A machine of the class described comprising, in combination, dough sheeting rollers; a subjacent receiving carrier traveling cross-wise of the delivering sheet; intermediate sheet supporting means comprising cooperating pressure-applying belts gripping the sheet for a substantial distance; and means to cause folding of the sheet alternately in reverse direction across the carrier.

17. In a machine of the class described, the combination with dough sheeting and sheet folding means of intermediate sheet supporting means comprising cooperating belts and means for pressing the belts throughout substantially their entire opposing surfaces equally against opposite surfaces of said sheet.

18. Dough sheeting means arranged to present a vertical traveling length of sheet, the weight whereof tends to deform the sheet, provided with weight carrying means for said length of sheet, said weight carrying means comprising cooperating belts 29, 30, the pressure plate 19$^a$, and yieldingly pressed means between which and said plate adjacent runs of said belts pass.

19. In a machine of the class described, the combination of dough sheeting means, sheet folding means, and traveling means associated with the folding means for engaging and supporting the sheet from opposite sides throughout a substantial distance between the sheeting means and the point of deflection of the sheet in the folding operation.

20. A machine of the class described comprising, in combination, dough sheeting rollers; a receiving carrier traveling in a direction cross-wise of the sheet delivered thereto; means supporting the sheet between said rollers and carrier and delivering the same at a point in fixed relation to said dough sheeting rollers; means for deflecting the sheet in alternate directions across the carrier; and sheeting rollers for operation upon the dough delivered by the carrier.

21. A machine of the class described comprising, in combination, continuously discharging dough working and shaping means; dough sheeting means; sheet folding means including means for disposing the folds for cross-rolling; travelling means associated with the folding means for gripping a substantial length of and supporting the sheet between the sheeting means and point of deflection of the sheet in the folding operation; and cross-rolling means for reducing the folded material to a sheet.

22. A machine of the class described comprising, in combination, continuously discharging dough working and shaping means; a plurality of sets of sheeting rollers through which the dough is successively passed; and sheet manipulating means between successive sets of rollers constructed and arranged for successively folding the sheet in reverse directions, while supporting the sheet for a substantial length before folding and in such manner as to relieve it of tensile strain, and disposing the folds for cross-rolling by the second set of rollers.

23. The combination with the receiving belt 17, of the carriage 45 therefor, belt-supporting means and driving connections carried by the carriage, and flexible power transmitting means.

24. The combination of the receiving carrier 17, carriage 45, swinging transfer belt 50 and its pivoted frame and driving connections.

25. In a machine of the class described, the combination with dough sheeting and sheet folding means, of intermediate sheet supporting means comprising cooperating belts engaging the sheet at opposite sides substantially throughout their lengthwise runs and means for variably pressing the belts against the sheet in accordance with the character of material composing the sheet.

26. A machine of the class described comprising in combination, dough sheeting rolls, a receiving carrier moving crosswise of the sheet delivered thereto from said rolls, means for relatively moving said rolls and carrier alternately in opposite directions transversely of the carrier, whereby the deposited sheet is folded to and fro across the carrier, means for variably controlling the crosswise movement of said carrier relative to the depositing of the sheet thereon, whereby to vary the angle and laminations of the folded sheet and predetermine at will the thickness and uniformity of the laminated sheet, and means for rolling the folded material in the direction of its overall length and hence crosswise of the folds.

27. A machine of the class described comprising, in combination, dough sheeting rolls, a receiving carrier moving crosswise of the sheet delivered thereto from said rolls, means for relatively moving said rolls and carrier alternately in opposite directions transversely of the carrier, whereby the deposited sheet is folded to and fro across the carrier, means for variably controlling the relative transverse movements between the rolls and carrier to predetermine at will the width of the laminated sheet, and means for rolling the folded material in the direction of its overall length and hence crosswise of the folds.

28. A machine for laminating and rerolling a dough sheet comprising in combination dough sheeting and rerolling means, sheet folding means for folding the sheet in overlapping zig-zag folds, said folding means including a laterally shifting conveyor and means for delivering the folded sheet to the rerolling means.

In testimony whereof, I have signed my name to this specification.

THOMAS L. GREEN.